H. H. BROMLEY.
NECK YOKE CENTER.
APPLICATION FILED JUNE 23, 1908.

904,934.

Patented Nov. 24, 1908.

3 SHEETS—SHEET 1.

Witnesses

Inventor
Howard H. Bromley
By Chandler & Chandler
Attorneys

H. H. BROMLEY.
NECK YOKE CENTER.
APPLICATION FILED JUNE 23, 1908.
904,934.
Patented Nov. 24, 1908.
3 SHEETS—SHEET 2.
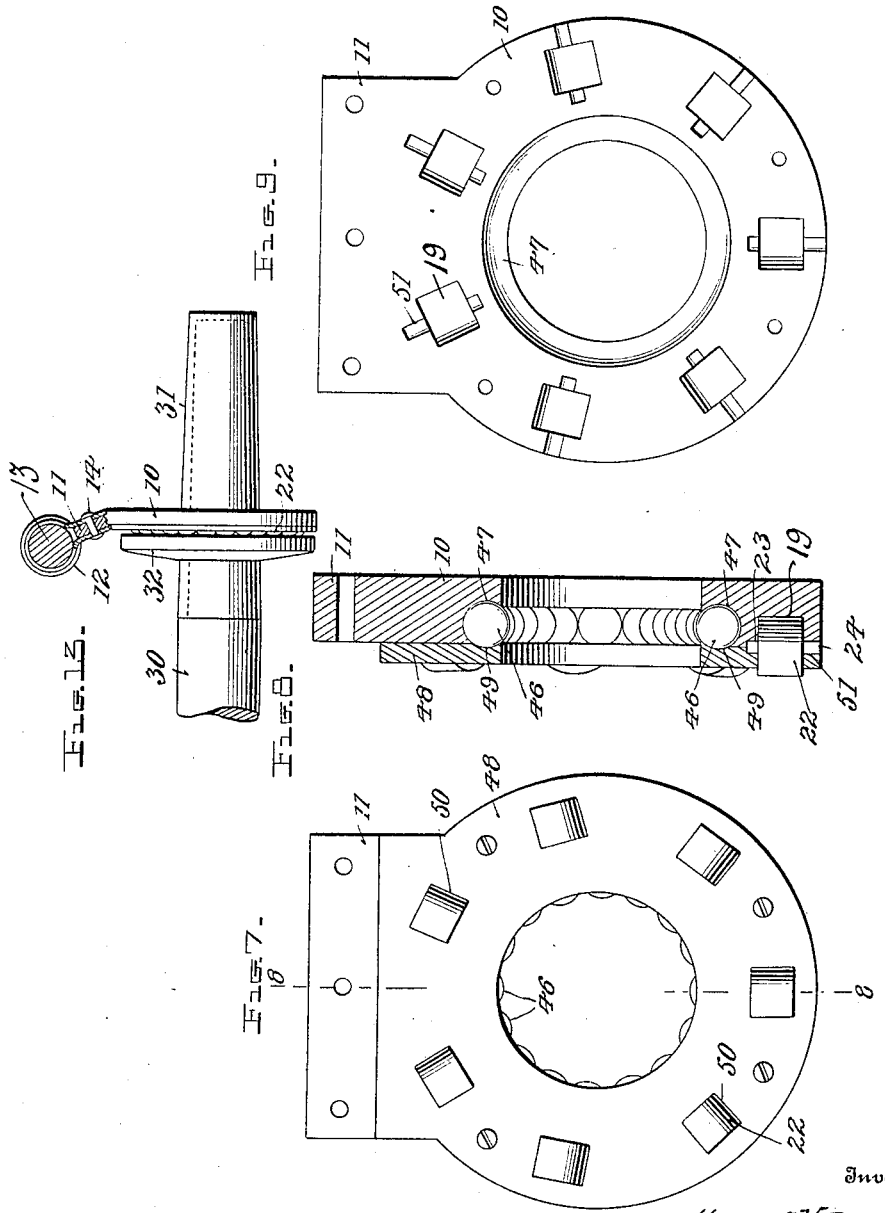
Witnesses
Helge C. A. Murray
C. H. Woodward
Inventor
Howard H. Bromley
By Chandlee & Chandlee
Attorneys H. H. BROMLEY.
NECK YOKE CENTER.
APPLICATION FILED JUNE 23, 1908.
904,934.
Patented Nov. 24, 1908.
3 SHEETS—SHEET 3.
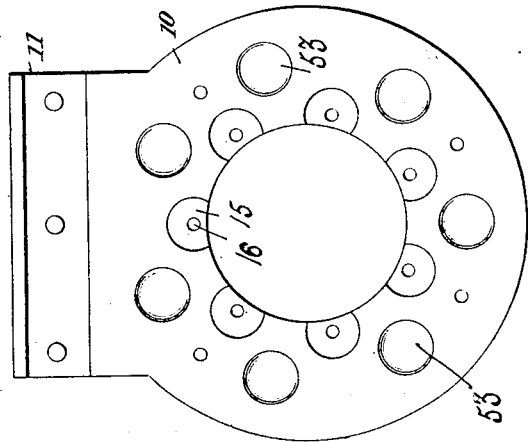
Fig. 12.
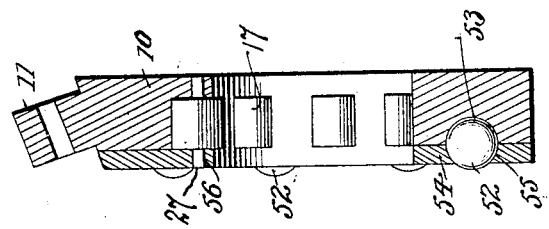
Fig. 11.
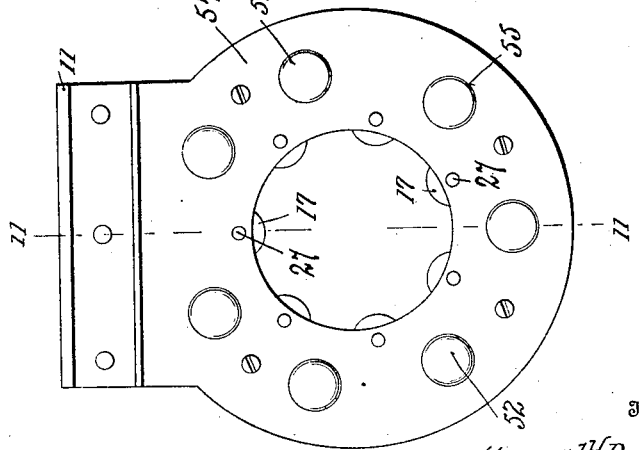
Fig. 10.
Witnesses
Inventor
Howard H Bromley
By
Attorneys
THE NORRIS PETERS CO., WASHINGTON, D. C.

UNITED STATES PATENT OFFICE.

HOWARD H. BROMLEY, OF MILFORD, DELAWARE.

NECK-YOKE CENTER.

No. 904,934.  Specification of Letters Patent.  Patented Nov. 24, 1908.

Application filed June 23, 1908. Serial No. 440,028.

*To all whom it may concern:*

Be it known that I, HOWARD H. BROMLEY, a citizen of the United States, residing at Milford, in the county of Kent, State of Delaware, have invented certain new and useful Improvements in Neck-Yoke Centers; and I do hereby declare the following to be a full, clear, and exact description of the invention, such as will enable others skilled in the art to which it appertains to make and use the same.

This invention relates to neck yoke centers, or the coupling means between the neck yoke and draft tongue, and has for one of its objects to improve the construction and increase the efficiency and utility of devices of this character.

Another object of the invention is to produce a simply constructed device of this character wherein anti-friction devices are arranged between the body of the pole or tongue and the yoke supporting appliances, and likewise between the stop flange on the pole or tongue and the supporting appliance.

Figure 1:
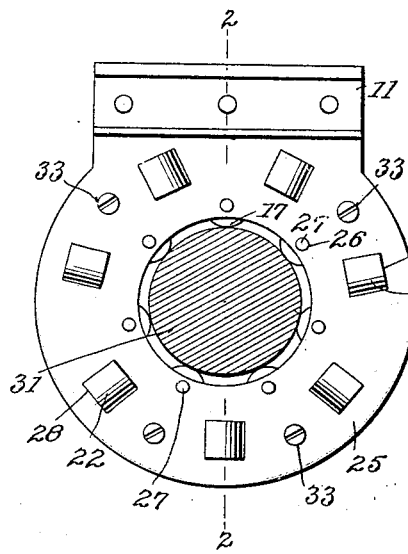
Figure 2:
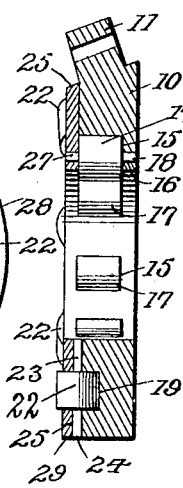
Figure 3:
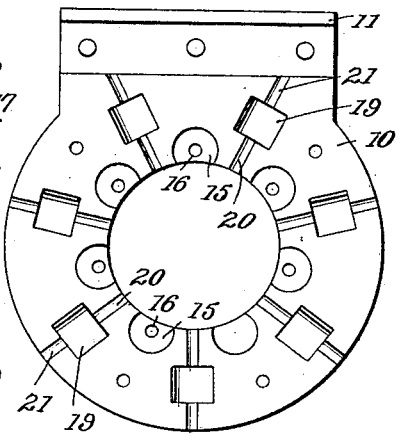
Figure 4:
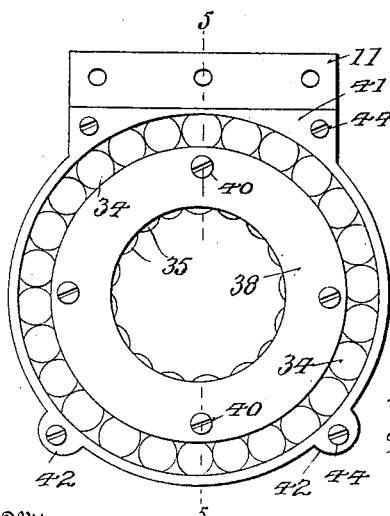
Figure 5:
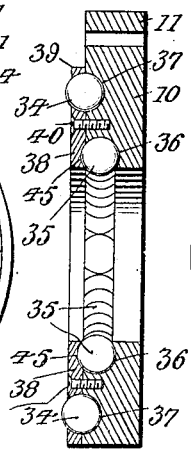
Figure 6:
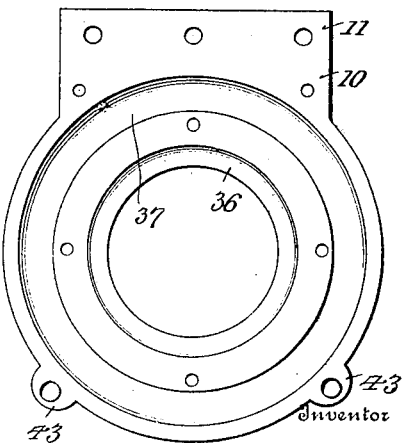

With these and other objects in view the invention consists in certain novel features of construction as hereafter shown and described and then specifically pointed out in the claims, and in the drawings illustrating the preferred embodiment of the invention, Figure 1 is a rear elevation of the improved device. Fig. 2 is a section on the line 2—2 of Fig. 1. Fig. 3 is an elevation of the front or main member of the device. Fig. 4 is a rear elevation illustrating a modification in the construction. Fig. 5 is a section on the line 5—5 of Fig. 4. Fig. 6 is a view of the front member of the construction shown in Figs. 4 and 5. Fig. 7 is a rear elevation illustrating another modification in the construction. Fig. 8 is a section on the line 8—8 of Fig. 7. Fig. 9 is a view of the main member of the construction shown in Figs. 7 and 8. Fig. 10 is a rear elevation illustrating another modification in the construction. Fig. 11 is a section on the line 11—11 of Fig. 10. Fig. 12 is a view of the main member of the construction shown in Figs. 10 and 11. Fig. 13 is a side view on a reduced scale of the tip portion of the draft tongue illustrating the manner of applying the invention.

The improved device comprises a main member 10 in annular form and with a wing 11 extending from one side to receive the terminals of a yoke band 12, the latter bearing around the yoke, represented at 13, and riveted at 14 to the wing portion. By this means the member 10 and its attachment is swingingly attached to the yoke.

In the preferred form of the device as illustrated in Figs. 1, 2 and 3, the member 10 is formed with a plurality of sockets 15 arranged transversely of the member and opening at their inner sides into the interior of the same, and each socket with a bearing 16 in its inner end, each socket to receive a roller 17 and each bearing to receive one of the journals 18 of the roller, the rollers thus projecting into the central open space of the main member, as shown. The member 10 is also provided with a plurality of radially disposed half sockets 19 in its rear face and between the inner sockets 15, each of the half sockets having half bearings 20—21 leading from its ends, and each socket designed to support a roller 22 with journals 23—24 engaging in the half bearings.

Bearing over the rear face of the member 10 is an annular plate 25 having spaced bearings 26 to receive the journals 27 of the rollers 17 and with spaced apertures 28 through which the rollers 22 project, the plate 25 also having half bearings 29 to receive the journals of the rollers 22.

The plate 25 is secured to the member 10 by screws or other suitable fastening means 33. By this arrangement both sets of rollers are supported in position, the rollers 17 projecting into the opening in the member 10 and the rollers 22 projecting beyond the face of the plate 25.

The tongue or pole of the vehicle, a portion of which is represented at 30, is provided with a sheathing or tongue end 31 of metal extending a sufficient distance from the outer end to be engaged by the rollers 17 when the tongue is engaged with the center device, the member 31 having a flange 32 intermediate the ends and extending at right angles thereto as shown, and against which the rollers 22 bear, as shown.

The projecting wing 11 is preferably disposed at an angle to the member 10 so that the draft line of the yoke extends in a direct line from the upper side of the member 10 to the collar connections, while the flange 32 is at right angles to the longitudinal plane of the tongue. By this arrangement it will be obvious that all the contacts between the tongue and its attachments and the yoke "center" are roller bearing contacts, and the friction thereby reduced to a minimum, and that all the pulling strains are against the relatively heavy body member 10 and the relatively thin plate 25 and its screws 33 relieved largely from strains.

In Figs. 4, 5 and 6, is shown a modification in the construction wherein a plurality of balls 34 are employed in place of the rollers 22 and a plurality of balls 35 employed in place of the rollers 17. In this modification the member 10 is provided with an annular bearing channel 36 in place of the series of sockets 15, and with an annular bearing channel 37 in place of the series of sockets 19, to carry the balls 34—35 respectively. In this modification also the single plate 25 with its apertures 28 and journal bearings 26 is replaced by two rings or annular plates 38—39 arranged concentrically, the inner ring 38 secured to the member 10 by screws 40 or other fastening means, and the outer ring 39 formed with a projection 41 bearing over the wing 11 and with perforated ears 42 corresponding to lugs 43 projecting from the member 10 and secured by screws 44 or other suitable means. The confronting edges of the rings 38—39 are concaved to bear upon the balls 34 and prevent them from falling out, while the inner face of the ring 38 is formed with a shallow channel 45 to support the balls 35 and prevent them from falling out. In this modification the balls 35 engage the body of the tongue end 31, and the balls 34 engage against the flange 32.

In Figs. 7, 8 and 9, another modification is shown wherein the rollers 17 are replaced by balls 46, the series of sockets 15 being replaced by an annular bearing channel 47 and the plate 25 replaced by a plate 48 having a shallow annular bearing channel 49 to support the balls and prevent them from falling out, and likewise provided with apertures 50 to receive the rollers 22 and with half bearings 51 to bear over the journals 23—24 of the rollers.

In Figs. 10, 11 and 12 still another modification is shown wherein the rollers 22 are replaced by balls 52, the series of sockets 19 being replaced with an annular ball receiving channel 53, and the plate 25 replaced by a plate 54 having apertures 55 through which the balls project and likewise with bearing apertures 56 for journals 27 of the rollers 17.

It is obvious that the slight changes required to adapt the device to rollers or balls, or rollers and balls does not constitute a departure from the principle of the invention.

The improved device will be constructed wholly of metal, is strong and durable, can be inexpensively manufactured, and effectually prevents all undue friction between the parts, and may be applied to neck yokes of various sizes and forms.

The shells 10 and the cover member 25 may be formed from pressed steel, or produced by drop forging, or constructed in any other required manner, and it is not desired therefore to limit the invention to any special or particular manner of forming the casings or shells.

What is claimed, is:—

1. In a device of the class described, an annular body having means for supporting anti-friction elements in position to project into the interior thereof, means for supporting anti-friction elements in position to project outwardly from one of its side faces, a draft tongue, a tongue end carried by said tongue and engaging against the inwardly extending anti-friction elements, and a flange extending from said tongue end intermediate the ends thereof and engaged by said outwardly extending anti-friction elements.

2. In a device of the class described, an annular body having a wing projecting from one side and with means for supporting anti-friction elements in position to project into the interior thereof, means for supporting anti-friction elements in position to project outwardly from one of its side faces, an annular member bearing upon said body and supporting said anti-friction elements in position, a neck yoke, a band bearing around said neck yoke and with extended terminals engaging said projecting wing, and means for coupling said extended terminals to said wing.

3. In a device of the class described, an annular body having a wing projection from one side at an angle to the longitudinal plane of the body, a neck yoke, a band bearing around said neck yoke and with extended terminals engaging said projecting wing, means for coupling said extended terminals to said wing, said body having means for supporting anti-friction elements in position to project into the interior thereof, means for supporting anti-friction elements in position to project outwardly from one of its side faces, a draft tongue, a tongue end carried by said tongue and engaging against the inwardly projecting anti-friction elements, a flange extending from said tongue end intermediate the ends thereof and engaged by said outwardly extending anti-friction elements.

In testimony whereof, I affix my signature, in presence of two witnesses.

HOWARD H. BROMLEY.

Witnesses:
E. D. PATTERSON,
CHAS. BOWDEN.